United States Patent [19]

Asano et al.

[11] 4,384,871

[45] May 24, 1983

[54] DYESTUFF-CONTAINING MICROSCOPIC CAPSULE DISPERSION FOR RECORD MATERIALS

[75] Inventors: Makoto Asano; Kiyoharu Hasegawa, both of Yokohama; Hiroyuki Akahori, Yokosuka; Michihiro Tsujimoto, Tachikawa, all of Japan

[73] Assignee: Mitsui Toatsu Chemicals, Inc., Tokyo, Japan

[21] Appl. No.: 347,415

[22] Filed: Feb. 10, 1982

[30] Foreign Application Priority Data

| | | | |
|---|---|---|---|
| Feb. 16, 1981 | [JP] | Japan | 56-20128 |
| Sep. 25, 1981 | [JP] | Japan | 56-150636 |
| Oct. 8, 1981 | [JP] | Japan | 56-159440 |

[51] Int. Cl.[3] .......... C09B 67/00

[52] U.S. Cl. .......... 8/599; 8/636; 523/161

[58] Field of Search .......... 523/161; 8/599, 636

[56] References Cited

U.S. PATENT DOCUMENTS

| | | | |
|---|---|---|---|
| 3,318,697 | 5/1967 | Shrewsbury | 430/97 |
| 4,001,140 | 1/1977 | Foris et al. | 427/151 |
| 4,087,376 | 5/1978 | Foris et al. | 428/320.6 |
| 4,089,802 | 5/1978 | Foris et al. | 428/320.6 |
| 4,299,411 | 11/1981 | Brockett | 8/636 |

FOREIGN PATENT DOCUMENTS

| | | |
|---|---|---|
| 42-7116052 | 5/1967 | Japan . |
| 45-4026597 | 2/1970 | Japan . |
| 49-4015227 | 4/1974 | Japan . |

OTHER PUBLICATIONS

The Merck Index, p. 1241 (1976).

*Primary Examiner*—Joseph L. Schofer
*Assistant Examiner*—N. Sarofim
*Attorney, Agent, or Firm*—Fisher, Christen & Sabol

[57] ABSTRACT

A dyestuff-containing microscopic capsule dispersion for record materials, which comprises at least one methine dyestuff represented by the general formula (I):

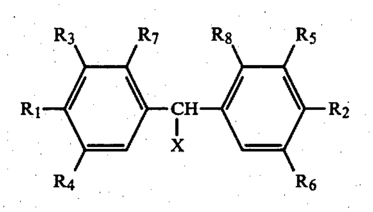

(I)

wherein X means a phenyl, naphthyl, indolyl, $\beta$-styryl, pyridyl, pyrimidyl or pyrazinyl group which may optionally be substituted, $R_1$–$R_6$ are individually an amino, substituted amino, lower alkyl, cycloalkyl, lower alkoxy or lower haloalkyl group or a halogen or hydrogen atom, $R_7$ and $R_8$ are each a hydrogen or halogen atom or a lower alkoxy group and may be coupled together to form a ring, and said methine dyestuff contains at least one substituted amino group at a position para to the central methine group in the molecule thereof, said methine dyestuff being contained in microscopic capsules; and alkanolamine represented by the general formula (II):

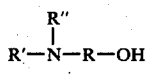

(II)

wherein R denotes a lower alkylene, hydroxyalkylene or poly(oxyalkylene) group, R′ and R″ mean individually a hydrogen atom, an alkyl, hydroxyalkyl, aryl, aralkyl, acyl, or $\omega$-hydroxyalkyl-polyoxyalkylene group or a lower alkyl ether of an $\omega$-hydroxyalkyl-polyoxyalkylene group, and R′ and R″ may be coupled together to form a ring, and/or a metal ion sequestering agent, said alkanolamine and/or metal ion sequestering agent being contained in said microscopic capsules and/or a liquid medium wherein said microscopic capsules are dispersed.

10 Claims, No Drawings

DYESTUFF-CONTAINING MICROSCOPIC CAPSULE DISPERSION FOR RECORD MATERIALS

BACKGROUND OF THE INVENTION

1. Field of the Invention

This invention relates to an improved dyestuff-containing microscopic capsule dispersion for record materials, which capsules are prevented from coloration, and more particularly to a dispersion in a liquid medium of microscopic capsules of a hydrophobic solvent solution containing an electron donative dyestuff which capsules are prevented from coloration and adopted to produce record materials such as pressure sensitive recording paper.

2. Description of the Prior Art

As a recording system making use of the color reaction through the mutual contact between a wide variety of electron donative dyestuffs and electron attractive acidic developers, there have been known pressure sensitive recording paper and the like.

The production of such pressure sensitive recording paper has been considerably increased in recent years as carbonless copying paper (i.e., non-carbon paper) with the trend of office work rationalization and the popularization of computers. Its demand is expected to increase still further in the future.

Pressure sensitive recording paper was first rendered marketable upon completion of the microencapsulation technology for a solution containing an electron donative dyestuff, taking the hint from the color reaction between crystal violet lactone (hereinafter, abbreviated as "CVL") and acidic clay. Owing to the subsequent technology improvement in various fields such as dyestuffs, developers, solvents for dyestuffs, microencapsulation technique and coating technique, the quality and performance of pressure sensitive recording paper have been steadily improved.

As electron attractive acidic developers, in addition to acidic clay which has been used from the dawn of pressure sensitive recording paper, other developers have been proposed and actually used, including phenolformaldehyde polymer, metal-modified phenol-formaldehyde polymer, substituted salicylic acids and their multivalent metal salts.

As electron donative dyestuffs, a number of dyestuffs have been proposed including (1) various phthalide dyestuffs led by CVL; (2) various fluoran dyestuffs; (3) various azaphthalide dyestuffs; (4) leucoauramine dyestuffs; (5) phthalan dyestuffs; (6) spiropyran dyestuffs; (7) acylleucophenothiazine dyestuffs; (8) diphenylmethane dyestuffs; and (9) triphenylmethane dyestuffs. In accordance with the development of new developers, besides CVL (phthalide) and benzoylleucomethylene blue (acylleucophenothiazine) that have actually been used from the beginning, varied types of phthalide dyestuffs, fluoran dyestuffs and azaphthalide dyestuffs have been adopted for actual use or are about to be used actually.

These dyestuffs are dissolved in a dyestuff solvent and encapsulated for use in the production of pressure sensitive recording paper. In such microscopic capsules, in place of polychlorinated biphenyls which were employed in the beginning, other hydrophobic solvents of low toxicity and high boiling point have been proposed and actually used including partially hydrogenated terphenyls, alkyldiphenyls, alkylbenzenes, alkylnaphthalenes, diallylalkanes and alkyldiphenylethers.

Regarding the microencapsulation method of the dyestuff-containing solvent, in addition to the microencapsulation making use of the gelatin-type coacervation method which was employed in the initial stage of the microencapsulation technology, a wide variety of microencapsulation techniques which are improved in both quality and applicability and make use of synthetic resin (for example, urea-formaldehyde, melamine-formaldehyde, polyamide and polyurethane resins, etc.) have been proposed. Some of such new microencapsulation techniques have already been employed in actual production.

Pressure sensitive recording paper is featured in that it can promptly produce a color of high intensity upon application of a writing or typing pressure. It is however accompanied by serious drawbacks such that the fastness of produced color marks (namely, light resistant fastness, heat resistant fastness, solvent resistant fastness, etc.) is poor and, upon exposure to light or contact with a polar solvent such as a plasticizer or during its storage at high temperatures, the color marks are susceptible of fading out and become eventually illegible. Thus, remedies for such drawbacks have been strongly waited for.

As a technique to improve the fastness of color marks produced on the aforementioned pressure sensitive recording paper, it has been proposed to use methine dyestuffs led by triphenyl methane dyestuffs (see, Japanese Patent Publication No. 16052/1971; and Japanese Patent Laid-open No. 20808/1975).

Although pressure sensitive recording paper, which makes use of a methine dyestuff led by a triphenyl methane dyestuff and an acidic color developer (for example, a clay-type color developer such as acidic clay or phenol condensate-type color developer), is slow in color-producing speed, it has a merit that it can provide color marks having far better fastness than color marks obtained from the combination of a phthalide dyestuff such as CVL or fluoran dyestuff and an acidic color developer.

However, such methine dyestuffs are accompanied by such drawbacks that (a) many methine dyestuffs are unstable during their storage and tend to develop colors due to photochemical reactions; (b) when they are dissolved in a hydrophobic solvent and converted to microscopic capsule dispersions in accordance with various encapsulation methods such as the complex coacervation method relying upon a gelatin-gum arabic system and the in-situ polymerization method of polyurea films to produce pressure sensitive copying paper, many methine dyestuffs are badly colored; and (c) pressure sensitive recording paper obtained by coating such microscopic capsule dispersions on substrate sheets are colored and give a visual impression different from that available from ordinary paper. Due to such drawbacks, it has been considered difficult to carry them out to practical use.

SUMMARY OF THE INVENTION

An object of this invention is to provide a dyestuff-containing microscopic capsule dispersion for record materials, which dispersion is not colored or colored extremely little and exhibits no coloring tendency along the passage of time even over a long storage period.

The present invention provides the following microscopic capsule dispersion for record materials:

A dyestuff-containing microscopic capsule dispersion for record materials, which comprises at least one methine dyestuff represented by the general formula (I):

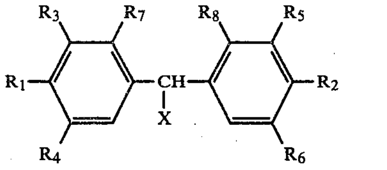
(I)

wherein X means a phenyl, naphthyl, indolyl, β-styryl, pyridyl, pyrimidyl or pyrazinyl group which may optionally be substituted, $R_1$–$R_6$ are individually an amino, substituted amino, lower alkyl, cycloalkyl, lower alkoxy or lower haloalkyl group or a halogen or hydrogen atom, $R_7$ and $R_8$ are each a hydrogen or halogen atom or a lower alkoxy group and may be coupled together to form a ring, and said methine dyestuff contains at least one substituted amino group at a position para to the central methine group in the molecule thereof, said methine dyestuff being contained in microscopic capsules; and alkanolamine represented by the general formula (II):

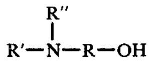
(II)

wherein R denotes a lower alkylene, hydroxyalkylene or poly(oxyalkylene) group, R' and R'' mean individually a hydrogen atom, an alkyl, hydroxyalkyl, aryl, aralkyl, acyl, or ω-hydroxyalkylpolyoxyalkylene group or a lower alkyl ether of an ω-hydroxyalkyl-polyoxyalkylene group, and R' and R'' may be coupled together to form a ring, and/or a metal ion sequestering agent, said alkanolamine and/or metal ion sequestering agent being contained in said microscopic capsules and/or a liquid medium wherein said microscopic capsules are dispersed.

DETAILED DESCRIPTION OF THE INVENTION

It has been found that dyestuff-containing microscopic capsules of extremely little coloration can be obtained and pressure sensitive recording paper obtained by coating thereon the above-mentioned microscopic capsules is colored extremely little and does not exhibit coloring tendency during the storage thereof by using the alkanolamine and/or metal ion sequestering agent in a step of dissolving a methine dyestuff represented by the aforementioned general formula (I) in a hydrophobic solvent and then microencapsulating it into fine oil droplets coated with gelatin or a synthetic resin in accordance with the coacervation, interfacial polymerization or in-situ polymerization method. The above-described methine dyestuff and the solvent therefor are contained as core materials inside the microscopic capsules whereas the alkanolamine and/or metal ion sequestering agent are contained outside the microscopic capsules.

To prepare dyestuff-containing microscopic capsule dispersions according to this invention, a variety of methine dyestuffs represented by the above-defined general formula (I) are used. Specific examples of such methine dyestuffs are as follows:

(A) Triaminotriphenylmethane dyestuffs 4,4',4''-tris-dimethylamino-triphenylmethane;
4,4',4''-tris-diethylamino-triphenylmethane;
4,4'-bis-methylamino-4''-methylamino-triphenylmethane;
4,4'-bis-diethylamino-4''-ethylamino-triphenylmethane;
4,4'-bis-diethylamino-4''-amino-triphenylmethane;
4,4'-bis-dimethylamino-3''-methyl-4''-amino-triphenylmethane;
4,4'-bis-dimethylamino-3''-methyl-4''-methylamino-triphenylmethane;
4,4',4''-tris-phenylamino-triphenylmethane;
4,4',4''-tris-(N-methyl-N-phenyl-amino)-triphenylmethane;
4,4'-bis-morpholino-4''-dimethylamino-triphenylmethane;
4,4',4''-tris-dimethylamino-2,2'-dimethyl-triphenylmethane;
4,4',4''-tris-dimethylamino-3,3'-dimethyl-triphenylmethane;
4,4',4''-tris-dimethylamino-2-methoxy-triphenylmethane;
4,4',4''-tris-dimethylamino-3-methyl-triphenylmethane;
4,4'-bis-dimethylamino-4''-N-benzylamino-triphenylmethane;
4,4'-bis-dimethylamino-4''-N-benzylamino-3''-methoxy-triphenylmethane;
4,4'-bis-dimethylamino-4''-N-benzylamino-3''-methyl-triphenylmethane;
4,4'-bis-dimethylamino-3''-chloro-4''-N-benzylamino-triphenylmethane;
4,4-bis-dimethylamino-4''-(N-benzyl-N-methylamino)-triphenylmethane;
4,4'-bis-dimethylamino-4''-(N-o-chlorobenzyl-N-methylamino)-triphenylmethane;
4,4'-bis-dimethylamino-4''-(N-p-chlorobenzyl-N-methylamino)-triphenylmethane;
4,4'-bis-dimethylamino-4''-(N-p-methylbenzyl-N-methylamino)-triphenylmethane;
4,4'-bis-dimethylamino-4''-(N,N-dibenzylamino)-triphenylmethane;
4,4'-bis-dimethylamino-4''-(N-phenyl-N-methylamino)-triphenylmethane;
4,4'-bis-dimethylamino-4''-morpholino-triphenylmethane;
4,4'-bis-N-benzylamino-4''-dimethylamino-triphenylmethane;
4,4'-bis-(N-benzyl-N-methylamino)-4''-dimethylamino-triphenylmethane;
4,4'-bis-(N-p-chlorobenzyl-N-methylamino)-4''-diethylamino-triphenylmethane;
4,4'-bis-(N-p-bromobenzyl-N-ethylamino)-4''-diethylamino-triphenylmethane;
4,4'-bis-pyrrolidyl-4''-dimethylamino-triphenylmethane;
4,4'-bis-(N-o-chlorobenzyl-N-methylamino)-4''-dimethylamino-triphenylmethane;
4,4'-bis-pyrrolidyl-4''-(N-benzyl-N-methylamino)triphenylmethane;
3,3'-dichloro-4,4'-bis-(N-benzylamino)-4''-dimethylamino-triphenylmethane;
4,4'-bis-(N-p-methylbenzyl-N-methylamino)-4''-dimethylamino-triphenylmethane;
4,4'-bis-(N-p-methylbenzyl-N-ethylamino)-4''-diisopropylamino-triphenylmethane;
3,3-dimethyl-4,4'-bis-(p-methylbenzylamino)-4''-dimethylamino-triphenylmethane;

3,3-dimethyl-4,4'-bis-(N-benzylamino)-4''-dimethylamino-triphenylmethane; and 3,3'-dibutyl-4,4'-bis-N-benzylamino-4''-diethylamino-triphenylmethane.

(B) Diaminotriphenylmethane dyestuffs 4,4'-bis-dimethylamino-triphenylmethane;

4,4'-bis-dimethylamino-4''-methyl-triphenylmethane;

4,4'-bis-(N-benzyl-N-ethylamino)-triphenylmethane;

4,4'-bis-dimethylamino-2-chloro-triphenylmethane;

4,4'-bis-diisopropylamino-3''-bromotriphenylmethane;

4,4'-bis-dimethylamino-4''-methoxy-triphenylmethane;

4,4'-bis-dimethylamino-4''-ethoxy-triphenylmethane;

4,4'-bis-dimethylamino-3''-methyl-4''-methoxy-triphenylmethane;

4,4'-bis-dimethylamino-3''-methyl-4''-ethoxy-triphenylmethane;

4,4'-bis-dimethylamino-3'',4''-dimethoxy-triphenylmethane;

4,4'-bis-dimethylamino-2'',4''-dimethoxy-triphenylmethane;

4,4'-bis-diethylamino-3''-ethyl-4''-ethoxy-triphenylmethane;

4,4'-bis-methylamino-3,3'-dimethyl-3''-butyl-4''-butoxy-triphenylmethane;

4,4'-bis-dimethylamino-3''-cyclohexyl-4''-methoxy-triphenylmethane;

4,4'-bis-propylamino-3''-phenyl-4''-propoxy-triphenylmethane;

4,4'-bis-(N-benzyl-N-methylamino)-3''-propyl-4''-methoxy-triphenylmethane;

4,4'-bis-(N-benzyl-N-methylamino)-3''-methyl-4''-ethoxy-triphenylmethane;

4,4'-bis-N-pyrrolidyl-3''-methyl-4''-methoxy-triphenylmethane;

4,4'-bis-N-piperidyl-3''-methyl-4''-ethoxy-triphenylmethane;

4,4'-bis-(dimethylamino)-3''-tert. butyl-4''-methoxy-triphenylmethane; and 4,4'-bis-(dimethylamino)-3'',4'',5''-trimethoxy-triphenylmethane.

(C) Monoaminotriphenylmethane dyestuffs 4,4'-dimethoxy-4''-dimethylamino-triphenylmethane;

4,4'-dimethoxy-3''-methyl-4''-methylamino-triphenylmethane;

4,4'-diethoxy-4''-diethylamino-triphenylmethane;

4,4'-dimethoxy-4''-(N-benzyl-N-methylamino)triphenylmethane;

3,3'-dimethyl-4,4'-dimethoxy-4''-dimethylamino-triphenylmethane;

4,4'-dimethoxy-4''-pyrrolydino-triphenylmethane; and 4,4'-dimethyl-4''-diethylamino-triphenylmethane;

(D) Naphthyldiphenylmethane dyestuffs bis-(4-diethylaminophenyl)-4'-N-phenylaminonaphthyl-1'-methane;

bis-(4-dimethylaminophenyl)-4'-ethylaminonaphthyl-1'-methane;

bis-(4-dimethylaminophenyl)-4'-methoxynaphthyl-1'-methane;

bis-(4-N-benzyl-N-methylaminophenyl)-3',4'-diethoxynaphthyl-1'-methane;

bis-(4-propylaminophenyl)-4'-methoxynaphthyl-2'-methane;

bis-(4-dimethylaminophenyl)-4'-dimethylaminonaphthyl-1'-methane; and bis-(3,4-diethoxyphenyl)-4'-(N-benzyl-N-methyl-)aminonaphthyl-1-methane.

(E) Diphenyl-β-styrylmethane dyestuffs bis-(4-dimethylaminophenyl)-β-styrylmethane;

bis-(3-methyl-4[N-phenylamino]phenyl)-β-styrylmethane;

bis-(4-[N-benzyl-N-methylamino]phenyl)-β-styrylmethane;

bis-(4-dimethylaminophenyl)-β-(4'-dimethylaminostyryl)methane;

bis(4-dimethylaminophenyl)-β-(4'-methoxystyryl)methane;

bis-(4-diethylaminophenyl)-β-(3'-methyl-4'-ethoxystyryl)-methane;

bis-(3-methyl-4-ethoxyphenyl)-β-(4'-diethylaminostyryl)-methane; and 4-methylphenyl-4'-diethylaminophenyl-β-(3'-tert-butyl-4'-dimethylaminostyryl)-methane.

(F) Leucomethine dyestuffs of the above general formula (I) in which X forms a heteroring bis-(4-dimethylaminophenyl)-4'-pyridylmethane;

bis-(3-methyl-4-[N-methyl-N-benzylamino]phenyl)-4'-pyridylmethane;

bis-(3-methyl-4-diehtylaminophenyl)-2'-pyrazinylmethane;

bis-(4-N-dibenzylaminophenyl)-2'-pyrimidylmethane;

bis-(4-dimethylaminophenyl)-(1'-ethyl-2'-methylindol-3'-yl)methane;

bis-(3-methyl-4[N-methyl-N-benzyl]phenyl)-(1',2'-dimethylindol-3'-yl)methane; and bis-(4-diethylaminophenyl)-(1'-butyl-2'-methylindol-3'-yl)methane.

(G) Other methine dyestuffs 3,6-bis-dimethylamino-9-phenylxanthene;

3,6-bis-diethylamino-9-phenylxanthene;

3,6-bis-dimethylamino-9-(3'-methyl-4'-dimethylamino-phenyl)-xanthene;

3,6-diethylamino-6,7-dimethyl-9phenylxanthene;

3,6-dimethoxy-9-(4'-dimethylaminophenyl)-xanthene;

3,6-diethoxy-9-(4'-dimethylnaphthyl-1')-xanthene;

3,6-bis-[N-methyl-N-phenylamino]-9-(3',4'-dimethoxy-phenyl)-xanthene;

3,6-bis-dimethylamino-9-phenylthioxanthene;

3,6-dimethylamino-9-(4'-methoxyphenyl)-10-methyl-9,10-dihydroacridine; and 3,6-bis-dimethylamino-9-(4'-dimethylaminophenyl)fluorene.

Needless to say, the methine dyestuffs are not limited to the specific compounds exemplified above.

A dyestuff-containing microscopic capsule dispersion according to this invention contains at least one of the above-described methine dyestuffs as its dyestuff component. As other dyestuffs usable together with such a methine dyestuff, may be mentioned for example phthalide dyestuffs represented by 3,3-bis-(4'-dimethylamino-phenyl)phthalide [malachite green lactone], 3,3-bis-(4-dimethylaminophenyl)-6-dimethylaminophenylphthalide[crystal violet lactone], 3,3-bis-(1'-ethyl-2'-methyl-indol-3'-yl)phthalide[indolyl red], 3-(1'-ethyl-2'-methyl-indol-3'-yl)-3-(4'-dimethylaminophenyl) phthalide, etc.; fluoran dyestuffs such as 3-diethylamino-6-methyl-7-anilinofluoran, 3-diethylamino-7,8-benzofluoran, 3-diethylamino-7-dibenzylaminofluoran, 3-piperidino-6-methyl-7-anilinofluoran, 3-diethylamino-6-chloro-7-anilinofluoran; azaphthalide dyestuffs led by 3-(2'-ethoxy-4'-diethylamino)-3-(1"-ethyl-2"-methylindol-3"-yl)-4-azaphthalide and the like; leucoauramine dyestuffs; spiropyran dyestuffs; diphenylmethane dyestuffs; and phenothiazine dyestuffs. They are merely examples of a wide variety of dyestuffs known to the public as dyestuffs for pressure sensitive recording paper.

The coloration preventive effect for methine dyestuffs can be achieved even if one or more of such compounds commonly known as dyestuffs for pressure sensitive recording paper are incorporated in a methine dyestuff-containing microscopic capsule dispersion.

Alkanolamines usable for the preparation of microscopic capsule dispersions according to this invention are represented by the general formula (II) and include, as specific examples, the following compounds:

(1) Alkanolamines containing a tertiary amino group tris-N-(2-hydroxyethyl)amine;
tris-N-(2-hydroxypropyl)amine;
tris-N-(3-hydroxypropyl)amine;
tris-N-(hydroxybutyl)amine;
tris-N-(2,3-dihydroxypropyl)amine;
N,N-dimethyl-N-(2-hydroxyethyl)amine;
N,N-diethyl-N-(2-hydroxyethyl)amine;
N,N-dipropyl-N-(2-hydroxyethyl)amine;
N,N-dibutyl-N-(2-hydroxyethyl)amine;
N-methyl-N-phenyl-N-(2-hydroxyethyl)amine;
N,N-diphenyl-N-(2-hydroxyethyl)amine;
N,N-dimethyl-N-(2-hydroxypropyl)amine;
N,N-diethyl-N-(2-hydroxypropyl)amine;
N,N-dipropyl-N-(2-hydroxypropyl)amine;
N,N-dibutyl-N-(2-hydroxypropyl)amine;
N,N-diphenyl-N-(2-hydroxypropyl)amine;
N-methyl-N,N-di(2-hydroxyethyl)amine;
N-ethyl-N,N-di(2-hydroxyethyl)amine;
N-phenyl-N,N-di(2-hydroxyethyl)amine;
N-methyl-N,N-di(2-hydroxypropyl)amine;
N-acetyl-N,N-di(2-hydroxyethyl)amine;
N-acetyl-N,N-di(2-hydroxypropyl)amine;
N-hydroxyethylmorpholine;
N-hydroxypropylmorpholine;
N-tetradecyl-N,N-di(ω-hydroxyethylpolyoxyethylene)amine;
N-dodecyl-N,N-di(ω-hydroxyethylpolyoxyethylene)amine;
N-octadecyl-N,N-di(ω-hydroxyethylpolyoxyethylene)amine;
N,N-didodecyl-N-(ω-hydroxyethylpolyoxyethylene)amine;
N,N-di-oleyl-N-(ω-hydroxyethylpolyoxyethylene)amine;
N,N-dioctadecyl-N-(ω-hydroxyethylpolyoxyethylene)amine;
aliphatic diamines added with alkylene oxides, for example, those represented by the following formula:

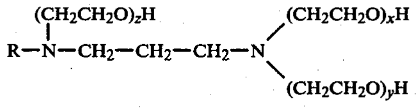

wherein, R denotes an aliphatic chain, and x, y and z stand individually for an integer;
N-(ω-hydroxyalkylpolyoxyalkylene) derivatives of aliphatic amides, for example, those represented by the following formula:

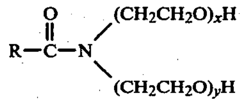

wherein R represents an aliphatic chain, and x and y denote individually an integer;
N,N'-bis(2-hydroxyethyl)-2-methyl-piperazine;
N,N'-bis(2-hydroxyethyl)-piperazine;
N,N'-bis(2-hydroxypropyl)-2-methyl-piperazine; and
N,N'-bis(2-hydroxypropyl)piperazine.

(2) Alkanolamines containing a secondary amino group

N,N-di(2-hydroxyethyl)amine;
N,N-di(2-hydroxypropyl)amine;
N,N-di(hydroxybutyl)amine;
N-methyl-N-(2-hydroxyethyl)amine;
N-butyl-N-(2-hydroxyethyl)amine;
N-dodecyl-N-(2-hydroxyethyl)amine;
N-phenyl-N-(2-hydroxypropyl)amine;
N-acetyl-N-(2-hydroxyethyl)amine;
N-acetyl-N-(2-hydroxypropyl)amine;
N-(2-hydroxyethyl)piperazine; and
N-(2-hydroxypropyl)piperazine.

(3) Alkanolamines containing a primary amino group

N-(2-hydroxyethyl)amine;
N-(2-hydroxypropyl)amine;
N-(hydroxybutyl)amine;
N-(1,3-dihydroxy-2-methylpropyl-2)amine;
N-(2,3-dihydroxypropyl)amine;
N-(2,3-dihydroxypropyl-2)amine;
N-(1,3-dihydroxy-2-butyl)amine;
N-(1-aminomethyl-2-hydroxyethyl)amine; and
N-(2-hydroxy-3-aminopropyl)amine.

It is desirous that these alkanolamines have a high boiling point, preferably a boiling point of at least 200° C., and more preferably, at least 250° C., because they are required to stay stably as stabilizers for a methine dyestuff represented by the general formula (I) on a base web sheet of a recording medium such as pressure sensitive recording paper and to exhibit its stabilization effect over a long period of time.

When an alkanolamine containing a primary or secondary amino group is applied to pressure sensitive recording paper, it is recognized that such an alkanolamine tends to suppress the color-producing ability relying upon a reaction between a dyestuff and a color developer if it is used too much. Accordingly, it is necessary to use such an alkanolamine as little as possible within its effective amount range. From the viewpoint of the performance of pressure sensitive recoring paper, it is thus preferred to employ an alkanolamine containing a tertiary amino group.

Examples of metal ion sequestering agents include: water-soluble organic metal ion sequestering agents such as ethylenediamine tetraacetic acid, N-hydroxyethyl-ethylenediamine-N,N',N'-triacetic acid, diethylene triamine pentaacetic acid, triethylene tetramine pentaacetic acid, nitrilotriacetic acid, N-hydroxyethyliminodiacetic acid, diethanol glycine, ethylenediamine-N,N'-diacetic acid, glycoletherdiamine tetraacetic acid, 1,3-diaminopropan-2-ol-tetraacetic acid, tartaric acid, citric acid, gluconic acid and saccharic acid, alkali metal salts and polyacrylates thereof, and metal salts of lignin sulfonic acid; metal ion sequestering agents soluble in dyestuff solvents including Schiff bases such as N,N'-disalicylidene ethylenediamine, 1,3-diketones such as trifluoroacetylacetone, thenoyltrifluoroacetone and pivaloylacetylacetone; higher amide derivatives of ethylenediamine tetraacetic acid; and polyphosphates such as sodium tripolyphosphate, sodium polymetaphosphate, sodium pyrophosphate and sodium dihydrogenpyrophosphate. Needless to say, the metal ion sequestering agent shall not be limited to the above specific examples.

Among such metal ion sequestering agents, water-soluble organic metal ion sequestering agents and polyphosphates are preferred. The former metal ion sequestering agents are particularly preferred.

In the present invention, the alkanolamine may be used in an amount of 1–10,000 parts by weight, preferably 10–5,000 parts by weight, and more preferably 20–2,000 parts by weight per 100 parts by weight of the methine dyestuff. On the other hand, the metal ion sequestering agent may be used in an amount of 0.1–1,000 parts by weight, and normally, in an amount of 100 parts by weight or less per 100 parts by weight of the methine dyestuff.

These metal ion sequestering agents and alkanolamines may be added (1) prior to forming microscopic capsule walls, (2) to a microscopic capsule dispersion which has undergone its microencapsulation step, or (3) to an aqueous coating formulation for pressure sensitive recording paper (in other words, a composition obtained by mixing microscopic capsules stilts and binders.).

Either one or both of the metal ion sequestering agent and alkanolamine may be contained together with one or more dyestuffs in microscopic capsules. It is also feasible that either one of the metal ion sequestering agent and alkanol amine is contained in microscopic capsules together with the dyestuff and the other is present in a liquid midium in which the microscopic capsules are dispersed. Alternatively, the dyestuff is contained in microscopic capsules and the metal ion sequestering agent and alkanol amine are present in a liquid medium in which the microscopic capsules are dispersed.

From the standpoints of coloration-inhibitory effect and economy, it is preferred to add such metal ion sequestering agent and alkanolamine at either one of the above stages (1) and (2) to obtain a microscopic capsule dispersion. Where the metal ion sequestering agent and alkanolamine are added in very large amounts in an initial stage of the microencapsulation steps, they may, depending on the microencapsulation method to be employed, impede the microencapsulation due to their reactions with reactive components(monomers) present in the microencapsulation system or disturbance to the equilibrium of the microencapsulation system. Therefore, it is desirous to suitably select the timing of addition of the metal ion sequestering agent and alkanolamine in accordance with specific microencapsulation method to be adopted.

In the present invention, alkanolamines exhibit a particular effect for inhibiting the coloration of the methine dyestuffs of the general formula (I) through their oxidation upon exposure to light or in the presence of air.

This invention has made it possible to prepare a coloration-free microscopic capsule dispersion with a methine dyestuff which has heretofore been considered to be useless for the above purpose due to its poor stability and to obtain a coloration-free record material such as pressure sensitive recording paper by causing a substrate sheet to carry a microscopic capsule layer resulting from the above microscopic capsule dispersion. It appears that the alkanolamines have an effect to maintain the methine dyestuffs in their reduced states (namely, in an uncolored state) and thus exhibit an effect to suppress the coloration of the methine dyestuffs due to their oxidation or their exposure to light. Incidentally, these alkanolamines do not have any special coloration-inhibitory effect for such dyestuffs as phthalides and fluorans which produce colors upon contact with an acid. However, they exhibit an outstanding effect for the inhibition of coloration through oxidation of methine dyestuffs, even in a dyestuff-containing microscopic capsule dispersion which includes both methine dyestuff and lactone dyestuff (phthalide or fluoran dyestuff). In addition, the metal ion sequestering agent can effectively avoid the undesirous coloration of methine dyestuffs and other dyestuffs such as lactone dyestuffs due to the presence of one or more multivalent metal ions, thereby affording an uncolored microscopic capsule dispersion and a white record material such as white pressure sensitive recording paper.

The production of microscopic capsules of this invention can be carried out in accordance with, for example, the coacervation method, interfacial polymerization method of in-situ polymerization method.

The coacervation method includes the following methods:

(1) Complex coacervation method making use of the electric interaction between polycationic colloid and polyanionic colloid;
(2) Salt coacervation method utilizing the salting-out effect through the addition of an electrolyte;
(3) Simple coacervation method in which a non-solvent to hydrophilic polymers (e.g., a non-electrolyte such as alcohol) is added;
(4) Insolubilization of polymer by changing the pH of an aqueous solution containing the polymer, thereby precipitating the polymer; and
(5) Phase separation method from an organic solution.

The interfacial polymerization method comprises causing a first and second polymer components, said components being capable of reacting mutually to form a polymer, present respectively in a dispersion medium (water) and in a core material (dyestuff-containing solution) dispersed in the dispersion medium; and allowing a polymerization or condensation reaction to occur at the boundaries between the dispersion medium and core material so as to produce microscopic capsules having a wall made of a synthetic resin. The interfacial polymerization method is suitable to produce, for example, microscopic capsules having a wall made of a synthetic resin such as nylon (polyamide), unsaturated polyester, polyureaurethane, epoxy, silicone or copolymer of an unsaturated dicarboxylic acid and styrene.

On the other hand, the in-situ polymerization method comprises supplying a monomer for a wall material and a polymerization catalyst from either the inside of a core material (dyestuff-containing solution) or the outside of the core material only, conducting its polymerization or condensation under such conditions that the polymerization or condensation reaction takes place on the surface of each core material (dyestuff-containing solution) and forming the wall of each microscopic capsule with the thus-prepared polymer. As a raw material, may be employed not only a monomer but also a low-molecular polymer or an initial condensation product. The in-situ polymerization method may for example be used to produce microscopic capsules having a wall made of polystyrene, urea resin, polyurethane, melamine, the formal derivatives of polyvinylalcohol, or the like. A microencapsulation method, which is capable to conduct in water, can be applied as a production method of such microscopic capsules.

More specifically, the following methods may be mentioned as typical microencapsulation methods: (1) Complex coacervation method in which a solution obtained by dissolving a methine dyestuff in a hydrophobic solvent having a high boiling point such as an alkylnaphthalene, diallylalkane, partially hydrogenated terphenol or alkyldiphenyl is microencapsulated making use of the coacervation between a polycationic colloid such as gelatin and polyanionic colloid such as gum arabic, carboxymethylcellulose and/or methylvinyl ether, or copolycondensation product of methylvinyl ether and maleic anhydride; and (2) In-situ polymerization method in which a wall of urea-formaldehyde resin is formed in the presence of a polymer of an anionic organic acid around each droplet of a dyestuff-containing solution, as proposed in Japanese Patent Laid-open Nos. 9079/1976 and 84882/1978.

In the above-described methods, a hydrophobic solvent of high boiling point is used as a solvent for an electron donative dyestuff represented by the general formula (I).

A wide variety of hydrophobic solvents of high boiling points may be used as such solvents, including organic solvents having high boiling points and being in a liquid state under microencapsulation conditions, which are for example alkylnaphthalenes such as methylnaphthalene, diisopropylnaphthalene, methylpropylnaphthalene and di-tert-butylnaphthalene; diarylalkanes such as diphenylethane, phenylxylylethane, dixylylmethane, diphenylpropane and phenylxylylpropane; alkylbiphenyls such as isopropylbiphenyl and diethylbiphenyl; triaryldimethanes such as partially hydrogenated terphenyl and triphenyldimethane; aprotic hydrophobic solvents such as alkylindanes, alkylbenzenes, benzylnaphthalenes and diarylalkylenes; aromatic and aliphatic carboxylates such as dibutylphthalate, dioctylphthalate, didodecylphthalate, dioctyladipate, tri-2-ethylhexyl-trimellitate, dioctylsebacate, dibutylazelate and benzylbenzoate; and hydrophobic polar solvents such as alkyldiphenyl ethers, alkylbenzophenones and esters of phosphoric acid (for example, tricresylphosphate). They may be used solely or in combination.

For applying the dyestuff-containing microscopic capsule dispersion according to this invention to produce pressure sensitive recording paper, the microscopic capsule dispersion is first converted to an aqueous coating formulation by mixing it with an anti-pollutional stilt such as cellulose floc (pulp powder), starch particles (e.g., starch produced from a starch source such as wheat, corn, potatoes, sweet potatoes, sago, tapioca, rice, glutinous rice, glutinous corn or the like, a starch derivative such as an oxidized starch obtained by treating such starch with an oxidizing agent, esterified starch represented by acetylated starch, etherified starch or aldehydostarch, or denatured starch), talc, calcium carbonate particles or polystyrene resin particles as well as, as a binder, an aqueous solution of a water-soluble polymer (e.g., polyvinylalcohol, soluble starch, carboxymethylcellulose, casein, or the like), and then applying the thus-prepared aqueous coating formulation on a support such as paper to obtain a coated back for pressure sensitive copying paper. Alternatively, such an aqueous coating formulation may be coated together with its developer on the same surface of a sheet of paper, thereby providing a pressure sensitive recording paper of the self-contained type.

Compared with microscopic capsule dispersion which does not contain any metal ion sequestering agent, the microscopic capsule dispersion according to this invention is not colored at all or is colored extremely little and does not exhibit at all any tendency of coloration along the passage of time through their storage over a long time period.

Furthermore, a coated back of pressure sensitive recording paper, which back is coated with the microscopic capsule dispersion of this invention, (1) is not colored or is colored extremely little and cannot be distinguished visually from ordinary high quality paper; (2) does not exhibit any undesirous paper stain phenomenon (i.e., coloration at the coated surface) during its storage; and (3) has thus completely solved such problems that coated surfaces are inconveniently stained (colored) during production or particularly during storage, which problems have been encountered from time to time with pressure sensitive recording paper using conventional microscopic capsule dispersion.

The microscopic capsule dispersion of the present invention may also be applied, besides pressure sensitive recording paper, to such thermographic recording sheets making use of microscopic capsules as proposed in Japanese Patent Publication Nos. 15227/1974 and 26597/1974 as well as in a recording method such as disclosed in U.S. Pat. No. 3,318,697 in which microscopic capsules are ruptured by the heat generated by an electric current and caused to react with a developer, thereby forming a developed image.

In microscopic capsule dispersion of this invention, the coloration-preventive effect resulting from the use of alkanolamines and/or metal ion sequestering agents is exhibited excellently.

Namely, a microscopic capsule dispersion according to this invention, in other words, a microscopic capsule dispersion obtained by adding an alkanolamine and/or metal ion sequestering agent to microscopic capsules of a hydrophobic solvent solution containing one or more methine dyestuffs exhibit the following excellent effects upon its application for the production of a record material such as pressure sensitive recording paper or the like:

(1) It is possible to completely inhibit the coloration of a dyestuff-containing microscopic capsule dispersion due to the coloration of one or more dyestuffs contained therein;

(2) Where an alkanolamine having a primary or secondary amino group is employed out of the alkanolamines, it reacts with free formaldehyde present in a microscopic capsule dispersion which has been formed by using formaldehyde as a capsule-wall forming component and exhibits another utility of lowering the formaldehyde concentration, thereby providing a solution to the environmental problem of formaldehyde; and (3) where a dyestuff-containing microscopic capsule dispersion according to this invention is employed for the production of pressure sensitive recording paper, (i) The pressure sensitive recording paper is not colored at all on its surface which is coated with the capsule dispersion and cannot be distinguished visually from ordinary high quality paper;

(ii) The naturally-occurring coloration tendency of pressure sensitive recording paper can be considerably inhibited during its storage;

(iii) Since the pressure sensitive recording paper is highly protected from its tendency of developing a color on the coated surface under light exposure conditions, it can be used outdoors without inducing any problems although conventional pressure sensitive recording paper has been considered practically impossible to use it outdoors;

(iv) The coloration problem of the coated surface under high temperature storage conditions has been greatly improved.

Owing to such effects, it has become possible to apply methine dyestuffs, which are extremely unstable under environmental conditions and have not been put to practical use, to pressure sensitive recording paper and other record materials.

This invention will hereinafter be described specifically with reference to the following examples, in which all designations of part refer to part by weight.

EXAMPLE 1

Twenty five parts of a 6% aqueous solution of acid-treated gelatin were combined with 12.6 parts of diisopropylnaphthalene containing 4% by weight of leuco crystal violet (4,4',4''-tris-dimethylamino-triphenylmethane) dissolved therein. The resulting mixture was stirred and emulsified at 55° C. using a homo-mixer. While continuously stirring the resulting emulsion, 50 parts of a 1% aqueous solution of carboxymethylcellulose (average polymerization degree: 160; etherification degree: 0.70) were mixed and 30 parts of warm water were added further to dilute the emulsion. The pH level of the emulsion was then adjusted with acetic acid to 4.3, thereby inducing coacervation. While continuing the stirring, the liquid temperature was cooled to 8°–9° C. to gel the coacervate films, followed by the addition of 1.75 parts of a 37% aqueous solution of formaldehyde and the further dropwise slow addition of an aqueous 10% caustic soda solution to adjust the pH to 10.5 and to harden the coacervate films. Then the liquid temperature was raised to 40° C. and thereafter allowed to cool down to room temperature, thereby completing the microencapsulation step.

Then, 5 parts of tri(2-hydroxypropyl)amine were added to and mixed with the coacervation solution. The resulting solution was allowed to stand twice around the clock to obtain a white microscopic capsule dispersion.

Another microscopic capsule dispersion was prepared in the same way without using tri(2-hydroxypropyl)amine. It was turned to blue.

EXAMPLE 2

In 100 parts of phenylxylylethane containing 5% by weight of 4,4'-bis-dimetnylamino-4''-(N-benzyl-N-methylamino)-triphenylmethane dissolved therein, were mixed an aqueous solution obtained by dissolving 20 g of acid-treated gelatin in 160 parts of water and adjusting its pH to 10.0 with an aqueous 10% caustic soda solution. The resulting mixture was emulsified in a homo-mixer, followed by the addition of an aqueous solution prepared by dissolving 20 parts of gum arabic and 0.3 part of the sodium salt of polymethylvinyl ether maleic anhydride in 150 parts of water of 55° C. The resulting mixture was emulsified at a high speed for further 30 minutes.

Thereafter, 200 parts of warm water of 55° C. were dropped over 30 minutes and the pH of the resulting emulsion was lowered to 4.5 with an aqueous 10% acetic acid solution, thereby inducing coacervation.

The temperature of the coacervation system was next lowered to 7° C., followed by the addition of 21 parts of a 37% aqueous solution of formaldehyde. The pH of the resultant mixture was raised to pH 10.5 by adding an aqueous 10% NaOH solution thereto in the course of 30 minutes and the resulting mixture was slowly heated to 50° C., thereby completing the hardening of microcapsule walls and thus finishing the microencapsulation step. Thereafter, 30 parts of tris-N-(2-hydroxyethyl)amine were added with stirring and the resultant mixture was allowed to stand until the subsequent day, thus providing a white microscopic capsule dispersion. The above procedure was followed except for the exclusion of tris-N-(2-hydroxyethyl)amine. The resultant microscopic capsule dispersion was colored in blue.

EXAMPLES 3–7

The procedure of Example 2 was followed except for the employment of each of 4,4'-dimethoxy-4''-dimethylamino-triphenylmethane, 4,4'-dimethylamino-3'',4''-dimethoxytriphenylmethane, 4,4'-dimorpholino-4''-dimethylaminotriphenylmethane, bis(4-dimethylaminophenyl-4'-methoxynaphthyl-1'-methane, bis(4'-dimethylaminophenyl)-2'-pyridyl-methane and 3,6-bisdiethylamino-9-phenylxanthene in lieu of 4,4'-bis-dimethylaminophenyl-4''-(N-benzyl-N-methylamino)-triphenylmethane to obtain microscopic capsule dispersions. They were all white.

EXAMPLE 8

A mixture of 100 parts of a 10% aqueous solution of an ethylene-maleic anhydride copolymer (trade name: EMA-31; product of Monsanto, St. Louis, Mo., U.S.A.) and 200 parts of water was subjected to a pH adjustment to pH 4.5 using an aqueous 20% sodium hydroxide solution. Into the resulting aqueous solution, were added 170 parts of phenylxylylethane containing 3% by weight of 4,4',4''-trisdiethylamino-triphenylmethane and 2% by weight of 3,3-bis(4-dimethylaminophenyl)-6-dimethylaminophthalide[crystal violet lacton] dissolved therein. The resulting solution was emulsified by a high-speed emulsifier until particle diameters became 2–10 μm. The thus-obtained emulsion was combined with an initial melamine-formaldehyde condensate which had been obtained by heating and fusing 26.5 parts of a 37% aqueous solution of formaldehyde and 20 parts of melamine and then stirred under a pH condition of pH 5.5 for 3 hours in a water bath of 55° C. It was then stirred at room temperature overnight, thereby causing a film of melamine-formaldehyde resin to cover each oil droplet and completing the microencapsulation step. Thereafter, 10 parts of tris-N-(2-hydroxyethyl)amine and 10 parts of di-N-(2-hydroxyethyl)amine were added and mixed thoroughly. The resulting liquid mixture was allowed to stand for 24 hours, resulting in a white microscopic capsule dispersion. The smell of formaldehyde present in the system vanished substantially.

The above procedure was followed without using tris-N-(2-hydroxyethyl)amine and di-N-(2-hydroxyethyl)amine. The resulting microscopic capsule dispersion had blue color.

EXAMPLE 9

A solution obtained by uniformly dissolving 25 parts of terephthaloyl dichloride in 67 parts of lauryl diphenyl ether containing 3.5% by weight of bis(4-dimethylaminophenyl)4'-methoxy-naphtyl-1'-methane was mixed with 250 parts of water containing 4 parts of polyvinyl alcohol and 0.1 part of pyrophosphoric acid dissolved therein. The resultant mixture was mixed and emulsified in a bromo-mixer and then maintained at 25° C. Then, an intimate liquid mixture of 0.5 part of ethylenediamine, 10 parts of hexamethylenediamine, 10 parts of NaOH and 75 parts of water was slowly dropped so as to induce a polyamide film formation reaction between terephthaloyl dichloride and the amines at interfaces of water and oil droplets, thereby completing the microencapsulation step. Thereafter, the resulting dispersion was combined with 15 parts of di-(ω-hydroxyethylpolyoxyethylene)stearylamine (trade mark: "Esomine"; product of Lion-Aczo Co., Ltd.) and allowed to stand twice around the clock, resulting in the provision of a white microscopic capsule dispersion.

The above procedure was followed without using di-(ω-hydroxyethylpolyoxyethylene)stearylamine. The resultant microscopic capsule dispersion was colored slightly blue.

EXAMPLE 10

12.6 parts of diisopropylnaphthalene containing 4% by weight of leuco crystal violet (4,4',4"-trisdimethylaminotriphenylmethane) dissolved therein and a 6% aqueous solution of acid-treated gelatin containing 0.2 part of disodium ethylenediamine-tetraacetate were mixed and stirred and emulsified at 55° C. in a bromo-mixer. While continuing the stirring, 50 parts of a 1% aqueous solution of carboxymethyl cellulose(average polymerization degree: 160; etherification degree: 0.70) were added, followed by the addition of 30 parts of warm water to dilute the liquid mixture. The pH of the thus-diluted liquid mixture was then adjusted to pH 4.3 with acetic acid to induce coacervation. It was then cooled down to 8°-9° C. with stirring, thereby gelling the coacervate films. After adding 1.75 parts of an aqueous 37% formaldehyde solution, its pH was adjusted to 10.5 by slowly adding dropwise an aqueous 10% caustic soda solution thereto to harden coacervate films. Then, the temperature of the liquid mixture was raised 40° C. and thereafter allowed to drop to room temperature, thereby completing the microencapsulation step.

Coloration was hardly recognized on the resultant microscopic capsule dispersion. The above procedure was followed without using any metal ion sequestering agent, resulting in the preparation of a blue-colored microscopic capsule dispersion.

EXAMPLE 11

In 100 parts of dioctylphthalate(DOP) containing 5% by weight of 4,4'-bis-dimethylamino-4"-N-benzyl-N-methylamino-triphenylmethane dissolved therein, was mixed a solution which had been obtained by dissolving 0.4 g of disodium N-hydroxyethyl-ethylenediamine triacetate and 20 g of acid-treated gelatin in 160 parts of water and then adjusting the resultant solution to 10.0 with an aqueous 10% caustic soda solution. The thus-prepared liquid mixture was emulsified in a homo-mixer, followed by the addition of a solution obtained by dissolving 20 parts of gum arabic and 0.3 part of the sodium salt of polymethylvinyl ether maleic anhydride in 150 parts of water of 55° C. The resulting liquid mixture was emulsified at a high speed for 30 minutes.

Then, 200 parts of warm water of 55° C. were added dropwise over 30 minutes and the pH of the thus-diluted liquid mixture was lowered to pH 4.5 with an aqueous 10% acetic acid solution to induce coacervation.

Next, the temperature of the system was cooled to 7° C., followed by the addition of 21 parts of a 37% aqueous solution of formaldehyde. The pH of the resulting system was raised to pH 10.5 in the course of 30 minutes with an aqueous 10% NaOH solution. The resulting liquid system was slowly heated to 50° C. to complete the hardening of microcapsule walls, resulting in the completion of the microencapsulation step.

The resultant microscopic capsule dispersion was white in color.

The above procedure was followed without using any metal ion sequestering agent. The resultant microscopic capsule dispersion was turned to blue.

EXAMPLES 12-15

The procedure of Example 2 was followed except for the employment of each of 4,4'-dimethylamino-3",4"-dimethoxytriphenylmethane, bis(4-dimethylaminophenyl)-4'-methoxynaphthyl-1'-methane, bis(4-dimethylaminophenyl)-9'-ethylcarbazol-3'-yl-methane and 3,3',3"-trimethyl-4,4',4"-triamino-triphenylmethane in place of 4,4'-bisdimethylaminophenyl-4"-(N-benzyl-N-methylamino)-triphenylmethane. Resultant microscopic capsule dispersions were either white or colored slightly.

EXAMPLE 16

Eighty five parts of a 10% aqueous solution of an ethylene-maleic anhydride copolymer (trade name: EMA-31; product of Monsanto, St. Louis, Mo., U.S.A.), 180 parts of water containing 2.0 parts of diethylene triamine pentaacetic acid and 0.3 g of nitrilotriacetic acid dissolved therein, 10 parts of urea and 1 part of resorsin were combined. Upon completion of dissolution, the pH of the resulting solution was adjusted to pH 3.3 with an aqueous 10% caustic soda solution.

Then, 170 parts of phenylxylylethane containing 5% by weight of 4,4',4"-trisdiethylamino-triphenylmethane dissolved therein were poured into the above pH-adjusted solution. The resulting liquid mixture was emulsified at a high speed in a homo-mixer, followed by an immediate addition of 20 parts of a 37% aqueous solution of formaldehyde. Then, the liquid mixture was subjected to polymerization while stirring the same at 55° C. for 3 hours. Upon allowing the liquid mixture to cool down, the microencapsulation was completed and microscopic capsule walls of urea-formaldehyde resin were thus formed. The thus-prepared microscopic capsule dispersion was colored slightly blue.

The above procedure was followed without using any metal ion sequestering agent. The resultant microscopic capsule dispersion was colored blue.

EXAMPLES 17-19

The procedure of Example 16 was followed except for the adoption of each of 4,4'-bisdimethylamino-3"-methyl-4"-methoxy-triphenylmethane, 4,4'-bisdimethylamino-2"-methyl-4"-dimethylamino-triphenylmethane and 4,4'-bisdimethylamino-2"-methoxy-4"-N-benzylamino-triphenylmethane in lieu of 4,4',4"-tris-diethylamino-triphenylmethane. Resultant microscopic capsule dispersions were all white in color.

EXAMPLE 20

In 67 parts of lauryl diphenyl ether containing 3.5% by weight of bis(4-dimethylaminophenyl)-2'-methoxy-1-naphthylmethane dissolved therein, were intimately dissolved 0.8 part of a higher alkylamide of ethylenediamine tetraacetic acid (trade mark: Chelest MZ-4; product of Chelest Chemical Co., Ltd.) and 25 parts of terephthalic chloride. The resultant liquid mixture was combined with 250 parts of water containing 4 parts of polyvinyl alcohol and 0.1 part of pyrophosphoric acid. The thus-obtained mixture was mixed and emulsified in a homo-mixer and then maintained at a temperature of 25° C. Thereafter, a homogeneous solution of 0.5 part of ethylene diamine, 10 parts of hexamethylene diamine, 10 parts of NaOH and 75 parts of water was slowly dropped into the above emulsion to cause a polyamide film formation reaction between terephthalic chloride and the amides to take place at interfaces between water and oil droplets, thereby completing the microencapsulation step.

The resultant microscopic capsule dispersion was white in color. The above procedure was followed without using any metal ion sequestering agent, resulting in the provision of a microscopic capsule dispersion which was colored slightly blue.

EXAMPLE 21

The procedure of Example 10 was followed except for the employment of diisopropylnaphthalene containing as dyestuffs 3% by weight of crystal violet lactone and 1.5% by weight of 4,4'-dimethylamino-4''-N-phenyl-N-methylamino-triphenylmethane. The resultant microscopic capsule dispersion had white color. The above procedure was followed without using any metal ion sequestering agent. The resulting microscopic capsule dispersion was colored blue.

EXAMPLE 22

12.6 Parts of diisopropylnaphthalene containing 4% by weight of leuco crystal violet (4,4',4''-tris-dimethylaminotriphenylmethane) and 25 parts of a 6% aqueous solution of acid-treated gelatin containing 0.2 parts of disodium ethylenediamine tetraacetate were combined together and emulsified with stirring at 55° C. in a homo-mixer. While continuing the stirring, 50 parts of a 1% aqueous solution of carboxymethylcellulose (average polymerization degree: 160; etherification degree: 0.70) were incorporated. The resulting liquid mixture was diluted with 30 parts of warm water, followed by a pH adjustment to 4.3 with acetic acid to induce coacervation. Then, while continuing the stirring, the temperature of the liquid mixture was cooled down to 8°-9° C. to gel the coacervate capsule walls. After adding 1.75 parts of a 37% aqueous solution of formaldehyde, the pH of the resultant liquid mixture was adjusted to 10.5 by slowly dropping an aqueous 10% caustic soda solution, thereby hardening the coacervate capsule walls. The temperature of the liquid mixture was raised to 40° C. and then allowed to drop to room temperature, resulting in the completion of the microencapsulation step.

Upon addition of 4 parts of tris-N-(2-hydroxypropyl-)amine and subsequent mixing, a microscopic capsule dispersion was obtained. It was white. The above procedure was followed without using disodium ethylenediamine tetraacetate and tris-N-(2-hydroxypropyl)amine. The resultant microscopic capsule dispersion was colored blue.

EXAMPLE 23

To 100 parts of phenylxylylethane containing 5% by weight of 4,4'-bis-dimethylamino-4''-N-benzyl-N-methylaminotriphenylmethane dissolved therein, was added a solution obtained by dissolving 20 parts of acid-treated gelatin in 160 parts of water and adjusting its pH to 10.0 with a 10% aqueous solution of caustic soda. The resulting liquid mixture was emulsified in a homo-mixer, followed by the addition of a solution prepared by dissolving 20 parts of gum arabic and 0.3 part of the sodium salt of polymethylvinyl ether maleic anhydride in 150 parts of water of 55° C. The resulting emulsion was emulsified further at a high speed for 30 minutes.

Then, 200 parts of warm water of 55° C. were added dropwise over 30 minutes and its pH was then lowered to pH 4.5 with a 10% aqueous solution of acetic acid to induce coacervation.

Thereafter, the temperature of the system was cooled down to 7° C. and 21 parts of a 37% aqueous solution of formaldehyde were added. The pH of the resulting liquid system was raised to 10.5 with an aqueous 10% NaOH solution in the course of 30 minutes. The liquid system was thereafter slowly heated to 50° C. to complete the hardening of microscopic capsule walls, thereby finishing the microencapsulation step. Then, 0.6 part of disodium N-hydroxyethyl-ethylenediamine triacetate and 20 parts of tris-N-(2-hydroxyethyl)amine were added and dissolved with stirring, resulting in the provision of a microscopic capsule dispersion. Immediately after its preparation, the microscopic capsule dispersion looked slightly blue but turned completely to white when allowed to stand until the subsequent day.

The above procedure was followed without using sodium N-hydroxyethyl-ethylenediamine triacetate and tris-N-(2-hydroxyethyl)amine. The resultant microscopic capsule dispersion was colored blue.

EXAMPLES 24-31

The procedure of Example 23 was followed except for the adoption of each of 4,4'-dimethoxy-4''-dimethylaminotriphenylmethane, 4,4'-dimethylamino-3'',4''-dimethoxytriphenylmethane, 4,4'-dimorpholino-4''-dimethylamino-triphenylmethane, bis(4-dimethylaminophenyl)-4'-methoxynaphthyl-1'-methane, bis(4-dimethylaminophenyl)-9'-ethylcarbazol-3'-yl-methane, bis(4-dimethylaminophenyl)-2'-pyridyl-methane, 3,3',3''-trimethyl-4,4',4''-triamino-triphenylmethane and 3,6-bisdiethylaminophenyl-9-phenylxanthene in stead of 4,4'-bisdimethylaminophenyl-4''-(N-benzyl-N-methylamino)-triphenylmethane. The resultant microscopic capsule dispersions were all white in color.

Without using the metal ion sequestering agent and alkanolamines, the same procedure was repreated. The resulting microscopic capsule dispersions were colored.

EXAMPLES 32-34

The procedure of Example 22 was followed except for the use of the following dyestuff-containing solutions:

Phenylxylylethane containing 2% by weight of 3,3-bis(4-dimethylaminophenyl)-6-dimethylaminophthalide(crystal violet lactone), 1.5% by weight of 4,4'- bis(dimethylamino)-3″-methyl-4″-ethylaminotriphenylmethane and 0.5% by weight of bis(4-dimethylaminophenyl)-4′-methoxynaphthyl-1′-methane (Example 32);

An equiweight mixture of a partially hydrogenated terphenyl and phenylxylylethane containing 4% by weight of 3-N-cyclohexyl-N-methylamino-6-methyl-7-anilinofluoran, 2% by weight of 4,4′-bis-dimethylaminophenyl-β-styrylmethane and 0.3% by weight of 3,3-bis(4-dimethylaminophenyl)-6-dimethylaminophthalide (Example 33); and Isopropyldiphenyl containing 3% by weight of 3,3-bis(4-dimethylaminophenyl)phthalide (malachite green lactone) and 2% by weight of 4,4′-dimethylamino-3″-methyl-4″-ethoxytriphenylmethane (Example 34).

In each of the above examples, the resultant microscopic capsule dispersion was white.

EXAMPLE 35

Using an aqueous 20% NaOH solution, the pH of a mixture of 100 parts of a 10% aqueous solution of an ethylene-maleic anhydride copolymer (trade name: EMA-31; product of Monsanto, St. Louis, Mo., U.S.A.) and 200 parts of water was adjusted to pH 4.5. To the resulting aqueous solution, were poured 200 parts of an equiweight mixture of phenylxylylethane and diisopropylnathphalene containing 2% by weight of 4,4′,4″-trisdiethylamino-triphenylmethane and 3% by weight of 3,3-bis(4′-dimethylaminophenyl)-6-dimethylaminophthalide dissolved therein. The resulting liquid mixture was emulsified in a high-speed emulsifier until particle sizes were reduced to 2–10 μm. Then, an initial melamine-formaldehyde condensate obtained by heating and melting a mixture consisting of 26.5 parts of a 37% aqueous solution of formaldehyde and 20 parts of melamine was added. The resulting mixture was stirred under a pH condition of 5.5 for 3 hours in a water bath of 55° C. By stirring the liquid mixture at room temperature overnight, melamine-formaldehyde resin films were formed on the surfaces of oil droplets, thereby completing the microencapsulation step. Then, 15 parts of di(hydroxypropyl)amine and 15 parts of 2-(N,N-dibutylamino)ethanol were added and mixed thoroughly, leading to the preparation of a microscopic capsule dispersion. After allowing it to stand twice around the clock, there was obtained a white microscopic capsule dispersion, from which the smell of formaldehyde initially present in the dispersion system had vanished.

When di(hydroxypropyl)amine and 2-(N,N-dibutylamino)ethanol were not employed, the resultant microscopic capsule dispersion was colored blue.

EXAMPLE 36

The procedure of Example 35 was followed except for the adoption of diisobutylnaphthalene containing 3% by weight of 3,3-bis(1′-ethyl-2′-methylindol-3′-yl)-phthalide [indolyl red] and 2% by weight of 4,4′-bismethoxy-4″-dimethylamino-triphenylmethane. The resultant microscopic capsule dispersion was white. When the metal ion sequestering agent and alkanolamine were not used, the resultant microscopic capsule dispersion was colored red.

EXAMPLE 37

Eighty five grams of a 10% aqueous solution of an ethylene-maleic anhydride copolymer (trade name: EMA-31; product of Monsanto, St. Louis, Mo., U.S.A.), 2.0 g of triethylenetetramine hexaacetic acid, 180 parts of water, 10 parts of urea and 1 part of resorcin were mixed thoroughly. After all solids were completely dissolved, the pH of the resulting solution was adjusted to pH 3.3 by adding a 10% aqueous solution of caustic soda.

Then, 170 parts of a partially hydrogenated terphenyl containing 4% by weight of 3-dimethylamino-6-methyl-7-anilinofluoran, 1.5% by weight of bis(4-dimethylaminophenyl)-β-styrylmethane and 0.4% by weight of 3-diethylamino-6-chloro-7-methylfluoran dissolved therein were added to the above aqueous solution. The resulting solution was emulsified until oil droplets are reduced in size to 2–10 μm, followed by an immediate addition of a 37% aqueous solution of formaldehyde. The resultant liquid mixture was subjected to polycondensation for 4 hours at 55° C. while stirring the same. Then, the pH of the resultant liquid mixture was adjusted to pH 9.0 with an aqueous 10% caustic soda solution. After stirring for one hour, the liquid mixture was allowed to cool down, thereby completing the microencapsulation step. Then, 50 parts of tris-(2-hydroxyethyl)amine were added to the microscopic capsules and intimately mixed. The resultant microscopic capsule dispersion was white. Where triethylenetetramine hexaacetic acid and tris-(2-hydroxyethyl)amine were not used, the resulting microscopic capsule dispersion has a greyish green color.

EXAMPLE 38

Using the microscopic capsule dispersions obtained in the above examples (both added with alkanolamines and/or metal ion sequestering agents and free of such additives), coating formulations of the following compositions which contained microscopic capsules were prepared. They were each coated on high quality paper by a bar coater to give a predetermined coating weight. Upon drying the thus-coated paper, CB-sheets for pressure sensitive recording paper were obtained. In the following compositions, all parts of microscopic capsule dispersions are on a dry weight basis.

| | | |
|---|---|---|
| (A) | Microscopic capsule dispersion | 100 parts |
| | Cellulose powder | 20 parts |
| | Oxidized starch (a 20% aqueous solution) | 25 parts |
| (B) | Microscopic capsule dispersion | 100 parts |
| | Wheat starch particles (mean particle size: 25 μm) | 5 parts |
| | Oxidized starch (a 20% aqueous solution) | 4 parts |
| (C) | Microscopic capsule dispersion | 100 parts |
| | Water | 125 parts |
| | Starch particles | 9 parts |
| | Calcium carbonate | 1 part |
| | Hydroxyethylether starch (a 10% aqueous solution) | 40 parts |

Coating formulations of the above composition (C) were adjusted to pH 8.5.

The extent of coloration of the coated surface of each CB-sheet was determined in terms of reflection intensity measured by a Macbeth transmission reflection densitometer and hue, shortly after its production, after exposure to direct sunlight for 20 minutes, and after storing it for 3 months in a dark place. Results are shown in Table 1.

TABLE 1

| Microscopic capsule dispersion used (Example No.) | Composition of coating formulation | Coated quantity of coating formulation (dry weight, g/m²) | Extent of coloration of coated surface of CB-sheet: With alkanolamine and/or metal ion sequestering agent: Hue of coated surface | Refection intensity* A | B | C | Without alkanolamine and metal ion sequestering agent: Hue of coated surface | Reflection intensity* A | B | C |
|---|---|---|---|---|---|---|---|---|---|---|
| 1 | A | 4.0 | white | 0.06 | 0.08 | 0.07 | blue | 0.30 | 0.32 | 0.34 |
| 2 | B | 4.0 | white | 0.06 | 0.09 | 0.07 | blue | 0.28 | 0.31 | 0.29 |
| 3 | B | 4.0 | white | 0.07 | 0.08 | 0.07 | light pink | 0.17 | 0.20 | 0.19 |
| 4 | B | 4.0 | white | 0.07 | 0.09 | 0.08 | blue | 0.14 | 0.18 | 0.15 |
| 5 | B | 4.0 | white | 0.06 | 0.08 | 0.08 | blue | 0.18 | 0.23 | 0.20 |
| 6 | B | 4.0 | white | 0.06 | 0.09 | 0.08 | light green | 0.12 | 0.15 | 0.14 |
| 7 | B | 4.0 | white | 0.07 | 0.10 | 0.09 | red | 0.27 | 0.31 | 0.28 |
| 8 | C | 5.0 | white | 0.07 | 0.09 | 0.08 | blue | 0.21 | 0.25 | 0.22 |
| 9 | C | 5.0 | white | 0.06 | 0.08 | 0.08 | blue/green | 0.12 | 0.15 | 0.14 |
| 10 | A | 4.0 | white | 0.07 | — | — | blue | 0.30 | — | — |
| 11 | B | 4.0 | white | 0.06 | — | — | blue | 0.28 | — | — |
| 12 | B | 4.0 | white | 0.06 | — | — | green | 0.19 | — | — |
| 13 | B | 4.0 | white | 0.07 | — | — | blue | 0.18 | — | — |
| 14 | B | 4.0 | white | 0.06 | — | — | light green | 0.11 | — | — |
| 15 | B | 4.0 | white | 0.07 | — | — | yellow/brown | 0.17 | — | — |
| 16 | C | 3.5 | slightly pale | 0.07 | — | — | blue | 0.21 | — | — |
| 17 | C | 3.5 | white | 0.06 | — | — | green | 0.21 | — | — |
| 18 | C | 3.5 | white | 0.07 | — | — | blue | 0.17 | — | — |
| 19 | C | 3.5 | white | 0.06 | — | — | blue | 0.15 | — | — |
| 20 | C | 3.5 | white | 0.06 | — | — | light blue | 0.12 | — | — |
| 21 | A | 4.0 | white | 0.06 | — | — | blue | 0.13 | — | — |
| 22 | A | 4.0 | white | 0.06 | 0.07 | 0.06 | blue | 0.30 | 0.34 | 0.36 |
| 23 | B | 4.0 | white | 0.06 | 0.06 | 0.07 | blue | 0.28 | 0.35 | 0.26 |
| 24 | B | 4.0 | white | 0.07 | 0.08 | 0.07 | pink | 0.17 | 0.25 | 0.18 |
| 25 | B | 4.0 | white | 0.06 | 0.07 | 0.06 | blue/green | 0.19 | 0.23 | 0.19 |
| 26 | B | 4.0 | white | 0.06 | 0.06 | 0.06 | blue | 0.21 | 0.24 | 0.22 |
| 27 | B | 4.0 | white | 0.07 | 0.08 | 0.07 | blue | 0.18 | 0.19 | 0.21 |
| 28 | B | 4.0 | white | 0.06 | 0.07 | 0.06 | light green | 0.11 | 0.14 | 0.12 |
| 29 | B | 4.0 | white | 0.07 | 0.07 | 0.08 | light green | 0.12 | 0.15 | 0.14 |
| 30 | B | 4.0 | white | 0.07 | 0.07 | 0.07 | yellow/brown | 0.17 | 0.20 | 0.18 |
| 31 | B | 4.0 | white | 0.06 | 0.06 | 0.06 | red | 0.27 | 0.29 | 0.26 |
| 32 | B | 4.0 | white | 0.06 | 0.06 | 0.07 | blue | 0.13 | 0.16 | 0.14 |
| 33 | B | 4.0 | white | 0.07 | 0.07 | 0.07 | dark green | 0.12 | 0.14 | 0.12 |
| 34 | B | 4.0 | white | 0.06 | 0.06 | 0.06 | green | 0.17 | 0.19 | 0.19 |
| 35 | C | 4.5 | white | 0.06 | 0.07 | 0.06 | blue | 0.15 | 0.20 | 0.15 |
| 36 | C | 4.5 | white | 0.06 | 0.07 | 0.07 | red | 0.19 | 0.21 | 0.20 |
| 37 | C | 4.5 | white | 0.07 | 0.08 | 0.07 | dark green | 0.14 | 0.15 | 0.14 |

Note:
*The smaller the reflection intensity, the lower the extent of coloration. Apparent coloration or tint can be recognized visually when the reflection intensity is 0.10 or higher.
A: After coating;
B: After exposure to direct sunlight for 20 minutes; and
C: After stored for 3 months in a dark place.

What is claimed is:

1. A dyestuff-containing microscopic capsule dispersion for record materials, which comprises at least one methine dyestuff represented by the general formula (I):

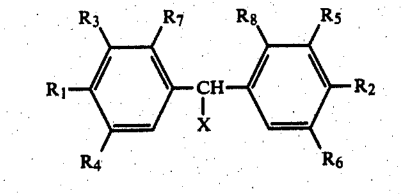

(I)

wherein X means a phenyl, naphthyl, indolyl, β-styryl, pyridyl, pyrimidyl or pyrazinyl group which may optionally be substituted, $R_1$-$R_6$ are individually an amino, substituted amino, lower alkyl, cycloalkyl, lower alkoxy or lower haloalkyl group or a halogen or hydrogen atom, $R_7$ and $R_8$ are each a hydrogen or halogen atom or a lower alkoxy group and may be coupled together to form a ring, and said methine dyestuff contains at least one substituted amino group at a position para to the central methine group in the molecule thereof, said methine dyestuff being contained in microscopic capsules; and alkanolamine represented by the general formula (II):

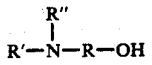

(II)

wherein R denotes a lower alkylene, hydroxyalkylen or poly(oxyalkylene) group, R′ and R″ mean individually a hydrogen atom, an alkyl, hydroxyalkyl, aryl, aralkyl, acyl, or ω-hydroxyalkyl-polyoxyalkylene group or a lower alkyl ether of an ω-hydroxyalkyl-polyoxyalkylene group, and R′ and R″ may be coupled together to form a ring, and/or a metal ion sequestering agent, said alkanolamine and/or metal ion sequestering agent being contained in said microscopic capsules and/or a liquid medium wherein said microscopic capsules are dispersed.

2. The microscopic capsule dispersion according to claim 1, wherein the alkanolamine has a boiling point of at least 200° C.

3. The microscopic capsule dispersion according to claim 2, wherein the alkanolamine has a boiling point of at least 250° C.

4. The microscopic capsule dispersion according to claim 2, wherein the alkanolamine contains a tertiary amino group.

5. The microscopic capsule dispersion according to claim 4, wherein the alkanolamine is tris-N-(2-hydroxyethyl)amine or tris-N-(2-hydroxypropyl)amine.

6. The microscopic capsule dispersion according to claim 1, wherein the metal ion sequestering agent is a water-soluble, organic metal ion sequestering agent.

7. The microscopic capsule dispersion according to claim 1, wherein the alkanolamine is contained in an amount of 1–10,000 parts by weight per 100 parts by weight of the methine dyestuff.

8. The microscopic capsule dispersion according to claim 1, wherein the metal ion sequestering agent is contained in an amount of 0.1–1,000 parts by weight per 100 parts by weight of the methine dyestuff.

9. The microscopic capsule dispersion according to claim 6, wherein the water-soluble organic metal ion sequestering agent is ethylenediaminetetraacetic acid, N-hydroxyethylethylenediamine triacetic acid, diethylenetriamine pentaacetic acid, nitrilotriacetic acid, triethylenetetramine hexaacetic acid, ethanol glycine, diethanol glycine, iminodiacetic acid, glycoletherdiamine tetraacetic acid, 1,2-diamino-propane-N,N'-tetraacetic acid, 1,3-diaminopropan-2-ol-tetraacetic acid, N,N-dicarboxylmethylaminobarbituric acid, 1,2-diaminocyclohexane tetracarboxylic acid, tartaric acid, gluconic acid, citric acid, saccharic acid, polyacrylic acid or lignin sulfonic acid, or an alkali metal salt thereof.

10. The microscopic capsule dispersion according to claim 1 or 7, wherein the metal ion sequestering agent is selected from sodium salts of ethylenediaminetetraacetic acid, sodium salts of diethylenetriamine pentaacetic acid, sodium salts of triethylenetetramine hexaacetic acid, higher aliphatic amides of ethylenediaminetetraacetic acid and sodium salts of N-hydroxyethyl-ethylenediamine-N,N',N'-triacetic acid.

* * * * *